United States Patent
Walton

[19]

[11] Patent Number: 6,009,867
[45] Date of Patent: Jan. 4, 2000

[54] APPARATUS AND METHOD FOR ACCELERATING CHARCOAL IGNITION

[76] Inventor: James E. Walton, 7340 Ashley Shores Cir., Lake Worth, Fla. 33467

[21] Appl. No.: 08/923,355

[22] Filed: Sep. 4, 1997

[51] Int. Cl.[7] .................................................... F24B 3/00
[52] U.S. Cl. ..................... 126/25 B; 126/25 R; 126/9 R; 126/9 B; 126/58
[58] Field of Search ............................... 126/58, 59, 59.5, 126/25 R, 25 B, 9 B, 9 R, 83, 14, 39 D, 39 F, 60

[56] References Cited

U.S. PATENT DOCUMENTS

| | | | |
|---|---|---|---|
| 164,592 | 6/1875 | Pierce | 126/83 |
| D. 262,053 | 11/1981 | Gavino | D23/90.1 |
| D. 277,224 | 1/1985 | Cole et al. | D23/90.1 |
| 289,553 | 12/1883 | Perlich . | |
| D. 366,392 | 1/1996 | Stephen et al. | D7/417 |
| 1,695,551 | 12/1928 | Hill et al. | 126/58 |
| 1,819,119 | 8/1931 | Pykosz | 126/58 |
| 3,060,868 | 10/1962 | MacLachlan | 110/1 |
| 3,159,119 | 12/1964 | Hottenroth et al. | 110/1 |
| 3,191,556 | 6/1965 | Hottenroth et al. | 110/1 |
| 3,209,712 | 10/1965 | Arena | 110/1 |
| 4,282,854 | 8/1981 | Byars | 126/25 B |
| 4,321,907 | 3/1982 | Sutter | 126/25 B |
| 4,331,125 | 5/1982 | Storandt | 126/25 B |
| 4,417,565 | 11/1983 | Karpinia | 126/25 B |
| 4,461,270 | 7/1984 | Sutter | 126/25 B |
| 4,503,835 | 3/1985 | Williams | 126/25 B |
| 4,531,507 | 7/1985 | Gerson | 126/25 B |
| 5,197,455 | 3/1993 | Tessien | 126/25 B |
| 5,213,075 | 5/1993 | Stephen et al. | 126/25 B |
| 5,230,325 | 7/1993 | Williams | 126/25 B |
| 5,469,835 | 11/1995 | Stephen et al. | 126/25 B |
| 5,507,274 | 4/1996 | Campbell et al. | 126/25 B |
| 5,638,807 | 6/1997 | Flamenbaum | 126/25 B |

FOREIGN PATENT DOCUMENTS

| | | | |
|---|---|---|---|
| 8402513 | 3/1986 | Netherlands | 126/25 B |

*Primary Examiner*—Carl D. Price
*Attorney, Agent, or Firm*—John C. Smith

[57] ABSTRACT

A charcoal igniter which has a thermal barrier attached to the top of the charcoal ignition chamber. The thermal barrier restricts airflow though the charcoal chamber and retains heat within the chamber to accelerate the burning process. The thermal barrier is perforated to allow air to flow through at a reduced rate to retain hot gas from ignition within the charcoal chamber. The thermal barrier may contain thermally resistive material, such as granulated or crushed lava roc which both retains heat to accelerate the ignition and improves safety by filtering exhaust gases to prevent ash and sparks from escaping. The thermally resistive material also acts to re-radiate heat back into the charcoal chamber to further accelerate the ignition of the charcoal. The charcoal igniter has a central charcoal chamber to hold charcoal and a top mounted thermal barrier to prevent heat from escaping. Optional primary ignition heat sources include a lower chamber for holding kindling such as paper, etc, and input ports for injection of ignited gases from sources such a propane gas supply. The thermal barrier may be attached via hinge, handle, etc. Optionally, a cooking surface may be integrated into the thermal barrier.

20 Claims, 14 Drawing Sheets

APPARATUS AND METHOD FOR ACCELERATING CHARCOAL IGNITION

BACKGROUND OF THE INVENTION

1. Technical Field

The present invention relates to charcoal starters. In particular, it relates to charcoal starters which accelerate the ignition of charcoal in a charcoal starter by retaining heat within the chamber that holds the charcoal with thermal barriers. The invention also relates to charcoal starters which provide improved safety by preventing ash and sparks from escaping the charcoal starter during the charcoal ignition process.

2. Background Art

A variety of methods are used for outdoor cooking, including smokers, gas or propane barbeque grills, charcoal grills, wood burning grills, etc. Each method of cooking has its own advantages and drawbacks.

Natural gas or propane grills have significant advantages over wood and charcoal grills in that they can be easily ignited and typically heat the grill to cooking temperature in a minimal amount of time. While their rapid heating provides convenience to the user, it has inherent drawbacks in that some foods prepared on conventional gas and propane grills do not taste as good as the same foods prepared on wood or charcoal grills. As a result, the convenience to the user provided by the rapid heating of gas and propane grills is offset by poorer quality food.

Another drawback to conventional gas/propane grills is that they are typically large and cumbersome to move. Therefore, they are not useful for day outings such as picnics.

Conventional charcoal grills are made in many convenient sizes which allow them to be easily moved and taken on outings. In addition, the charcoal briquettes used in a conventional barbeque results in excellent tasting food. However, a conventional charcoal grill, of any size, has a significant drawback in terms of the time it takes to prepare a meal. A significant part of the extra time for food preparation is consumed by the time required to heat charcoal briquettes. The long time required to ignite charcoal discourages its use and often results in food being prepared by devices that produce poorer taste.

The prior art has attempted to make charcoal ignition more convenient. Charcoal starters are known which ignite charcoal briquettes prior to their insertion into the grill. These devices typically are open cylinders which heat the charcoal from below. Once the charcoal is heated, it can be deposited into the grill by pouring the briquettes from the open top end of the cylinder. An advantage to this type of charcoal starting device is that it allows one batch of charcoal to be started while the grill is being used by a previous batch of charcoal. However, since this device also takes considerable time to ignite charcoal, a second batch of charcoal must be started well in advance of the time it is to be placed in the grill. As a result, charcoal may be wasted by starting batches that may not be needed by the time the charcoal is ready to use.

As discussed above, a significant drawback to prior art charcoal starters is that they do not significantly improve the time required to heat the charcoal directly in the grill. For example, approximately twenty to thirty minutes may be required to heat charcoal to the temperature required for cooking with a prior art charcoal starter. As a result, the user will often not have charcoal ready when it is needed, or alternatively, will prepare charcoal that may not be required by the time it finishes heating up. Due to these disadvantages, users will often forego the benefits of charcoal grills for the convenience of gas/propane grills.

A significant factor in the long delay times prior art charcoal starters require is the heat loss through the open top of the charcoal starter. Most of the heat generated by kindling or alternative heat sources is lost by too rapid escape of heat. In addition, ash and sparks ejected from the top of the charcoal starter pose a safety hazard to the user.

While addressing the basic desirability of using charcoal grills, the prior art has failed to provide a charcoal igniter that provides rapid ignition of charcoal by retaining heat within the charcoal igniter so that food can be prepared quickly, and already ignited charcoal can be conveniently replaced on short notice when necessary. Likewise, the prior art has not provided a charcoal igniter which improves safety by reducing the amount of ash and sparks that escapes from the charcoal igniter.

SUMMARY OF THE INVENTION

The present invention solves the foregoing problems by providing a charcoal igniter which has a thermal barrier attached to the top of the charcoal ignition chamber. The thermal barrier is attached to the top of the charcoal chamber around its periphery such that the top of the charcoal chamber is substantially sealed. The thermal barrier is perforated (i.e. one or more apertures) to allow air to flow through at a reduced rate to retain hot gas from ignition within the charcoal chamber to accelerate the charcoal ignition process. The thermal barrier may contain thermally resistive material, such as crushed lava rock which both retains heat to accelerate the ignition and improves safety by filtering exhaust gases to prevent ash and sparks from escaping. The thermally resistive material also acts to re-radiate heat back into the charcoal chamber to further accelerate the ignition of the charcoal. The charcoal igniter has a central charcoal chamber to hold charcoal and a top mounted thermal barrier to limit the amount of heat escaping from the charcoal chamber. Optional primary ignition heat sources include a lower chamber for holding kindling such as paper, etc, and input ports for injection of ignited gases from sources such a propane gas supply. The thermal barrier may be attached via hinge, handle, etc. Optionally, the thermal barrier can be used as a cooking surface.

DESCRIPTION OF THE PREFERRED EMBODIMENT

Prior to a detailed discussion of the figures, a general overview of the invention will be presented. The invention disclosed herein provides a novel thermal barrier which simultaneously provides several benefits. It provides a safety benefit by enclosing the exhaust port which in turn protects the user from ash and sparks which would fly out of a conventional charcoal starter. It also provides a substantial benefit by rapidly accelerating the charcoal ignition process. In particular, the thermal barrier discussed below provides a substantial performance improvement over prior art charcoal starters. A prior art charcoal starter may take 20–30 minutes to prepare charcoal such that it is ready for use. By comparison, the thermal barrier disclosed herein will ignite and have charcoal ready for use in a barbeque in 2–3 minutes.

The substantial improvement in ignition time provides several advantages. One advantage is that the users are not inconvenienced by long waiting times to prepare food. In addition, the users may also reduce their costs by avoiding unnecessary use of charcoal. This is because prior art devices have long ignition times which make the need for additional charcoal less certain. The thermal barrier's ability to rapidly accelerate charcoal ignition allows the user to avoid igniting additional charcoal until just before it is needed. This allows more accurate charcoal quantity choices and will also avoid the ignition of additional charcoal altogether if the cooking is completed before the additional charcoal is ignited. Of course, prior art devices would have had to ignite the charcoal long before it was needed which would result in the charcoal being discarded.

Figure 1:
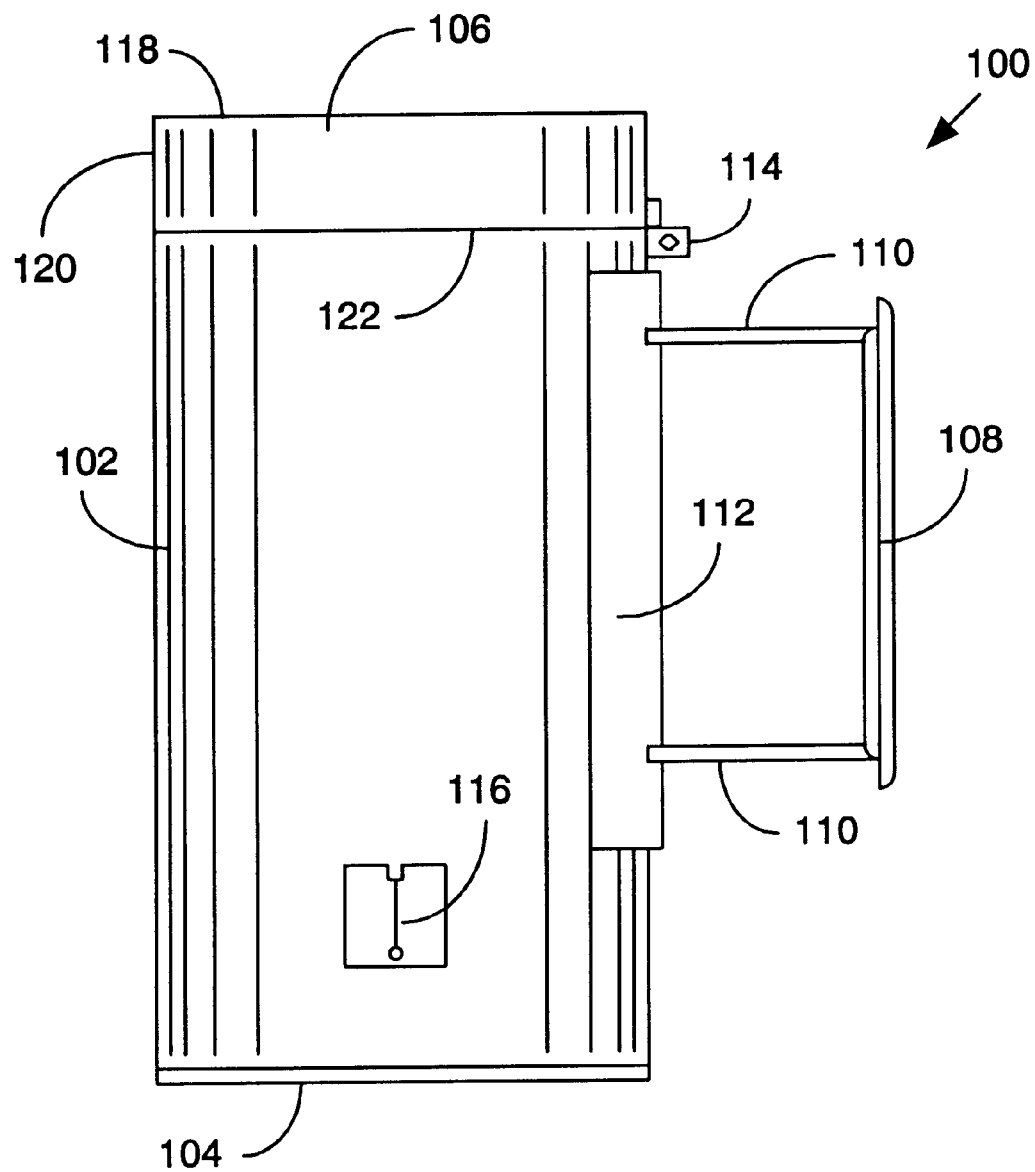
FIG. 1 is a left side view of a preferred embodiment of the device with a hingedly attached thermal barrier.

Referring to FIG. 1, a preferred embodiment of the charcoal igniter 100 is shown. This embodiment uses a generally cylindrical outer wall 102 which defines an internal charcoal chamber 708 (shown in FIG. 7) to hold charcoal 704 (shown in FIG. 7). The lower portion of cylindrical outer wall 102 may also be used to form an optional lower kindling chamber 710 (shown in FIG. 7). An access door 116 is shown in the side of cylindrical outer wall 102 which is used to access any kindling 706 (shown in FIG. 7) with a match or other starting device. An optional bottom lid 104 is also shown. Optional bottom lid 104 can be secured to cylindrical outer wall 102 by any suitable method, such as screw attachment, pressure fit, threading, etc. If a lower kindling chamber 710 is used to hold kindling 706, then bottom lid 104 will prevent any ash or residue from falling out of charcoal igniter 100 when it is lifted. Those skilled in the art will recognize that while the shape of the charcoal igniter 100 is shown as a cylinder (due to its ease of manufacture) the cylindrical outer wall 102 may take any convenient shape.

A handle 108, 110 is shown attached to the side of cylindrical outer wall 102 which allows the user to conveniently grasp and manipulate the charcoal igniter 100. Also shown is a heat shield 112 which is designed to protect the user's fingers from direct contact with cylindrical outer wall 102 when grasping handle 108, 110.

The cylindrical outer wall 102 is open at the top. The aperture formed by the opening is an exhaust port 608 (shown in FIG. 6) which would normally allow hot gases to flow away from the charcoal igniter 100 with a consequent loss of heat. In this embodiment, a thermal barrier 106 is attached to the top of the charcoal igniter 100 such that it rests on top of cylindrical outer wall 102 and substantially seals the top of cylindrical outer wall 102 such that the exhaust port 608 is closed. This reduces the amount of heat which escapes through the exhaust port 608 and results in a rapid acceleration of charcoal ignition due to the fast temperature rise created by the retained heat.

In the preferred embodiment, the thermal barrier 106 is attached to the cylindrical outer wall 102 (which defines the charcoal chamber 708 and exhaust port 608) via a hinge 114. The thermal barrier 106, as shown, has an upper surface 118, a lower surface 122, and a peripheral area 120. In this embodiment, the thermal barrier 106 is shown as a disc shaped structure, but those skilled in the art will recognize that the shape of thermal barrier 106 can vary so long as it substantially seals the exhaust port 608. Therefore, for ease of illustration the term "outer perimeter", as used herein, refers to the peripheral area 120, and any portions of the lower surface 122 which would be used to seal the thermal barrier 106 to the exhaust port 608. A simple gravity seal is shown in FIG. 1 which merely rests the thermal barrier 106 on top of exhaust port 608. However, thermal barrier 106 can also be formed in any shape which would allow the outer perimeter 120 to extend partially into the charcoal chamber 708, to thread the thermal barrier 106 onto the cylindrical outer wall 102, to extend the edge of the outer perimeter 120 over and/or down the side of the outer cylindrical wall 102, etc. The only requirement is that the thermal barrier 106 substantially seals the exhaust port 608 such that exhaust heat from the charcoal ignition process will have to pass through the apertures 402, 602 and over heat resistive material 702.

In addition to the improved ignition speed created by the thermal barrier 106, a safety benefit is also provided. In particular, prior art devices have safety problems due to hot ash and/or sparks flying out of the top of prior art devices. When thermal barrier 106 is in the ignition position (shown in this figure), it prevents ash and sparks from escaping which reduces hazard to the users. In this embodiment, thermal barrier 106 is hingedly attached to cylindrical outer wall 102 via hinge 114.

Figure 2:
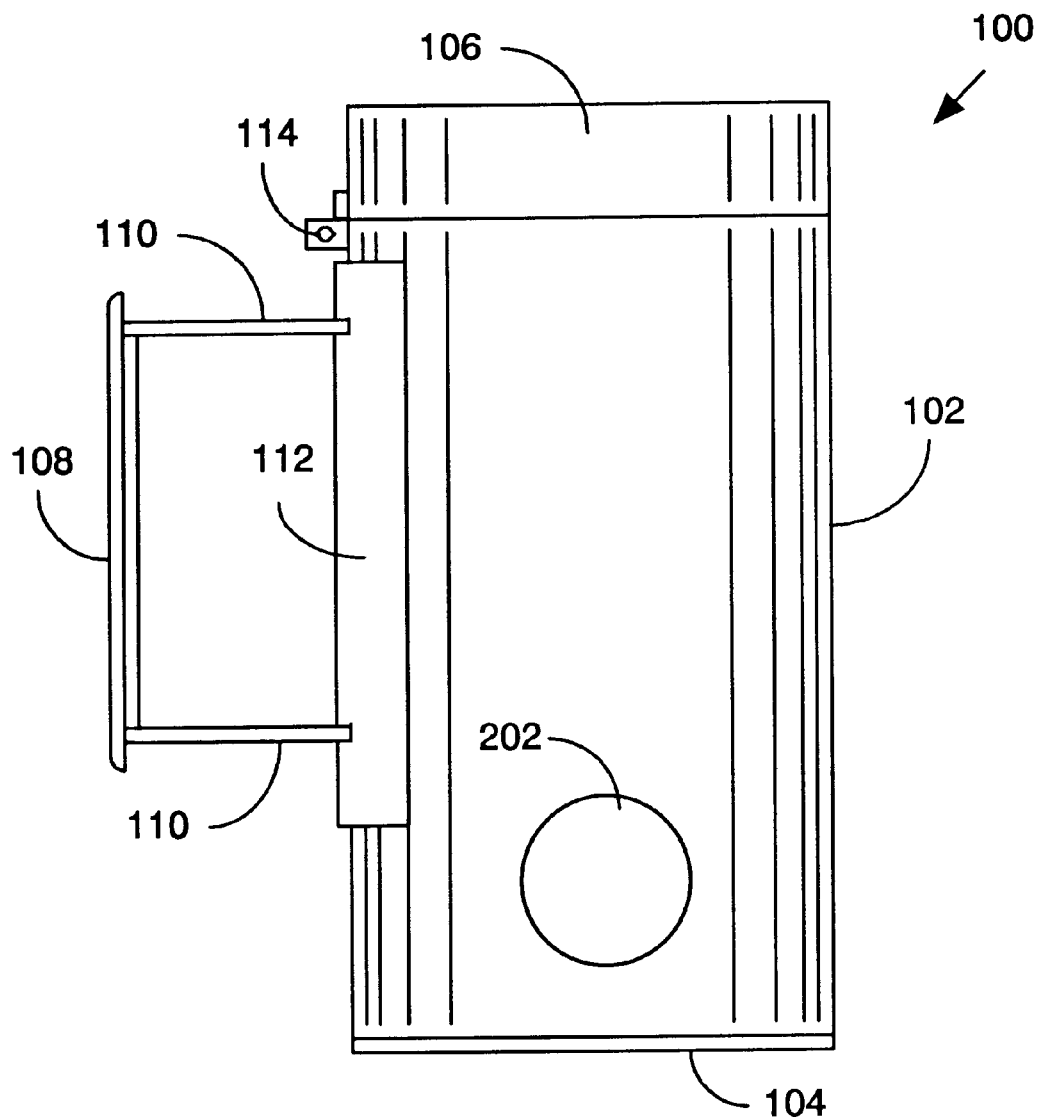
FIG. 2, is a right side view of the embodiment of FIG. 1. The view also shows an air intake port.

In FIG. 2, the embodiment of FIG. 1 is shown from the right side. This view also shows an air intake port 202 on the side of cylindrical outer wall 102. Air intake port 202 allows air to enter charcoal chamber 708 to support combustion of the charcoal 704 during the ignition process. Air intake port 202 can take any suitable shape. However, the round shape shown in FIG. 2 allows more convenient attachment of an air conduit as discussed more fully below.

Figure 3:
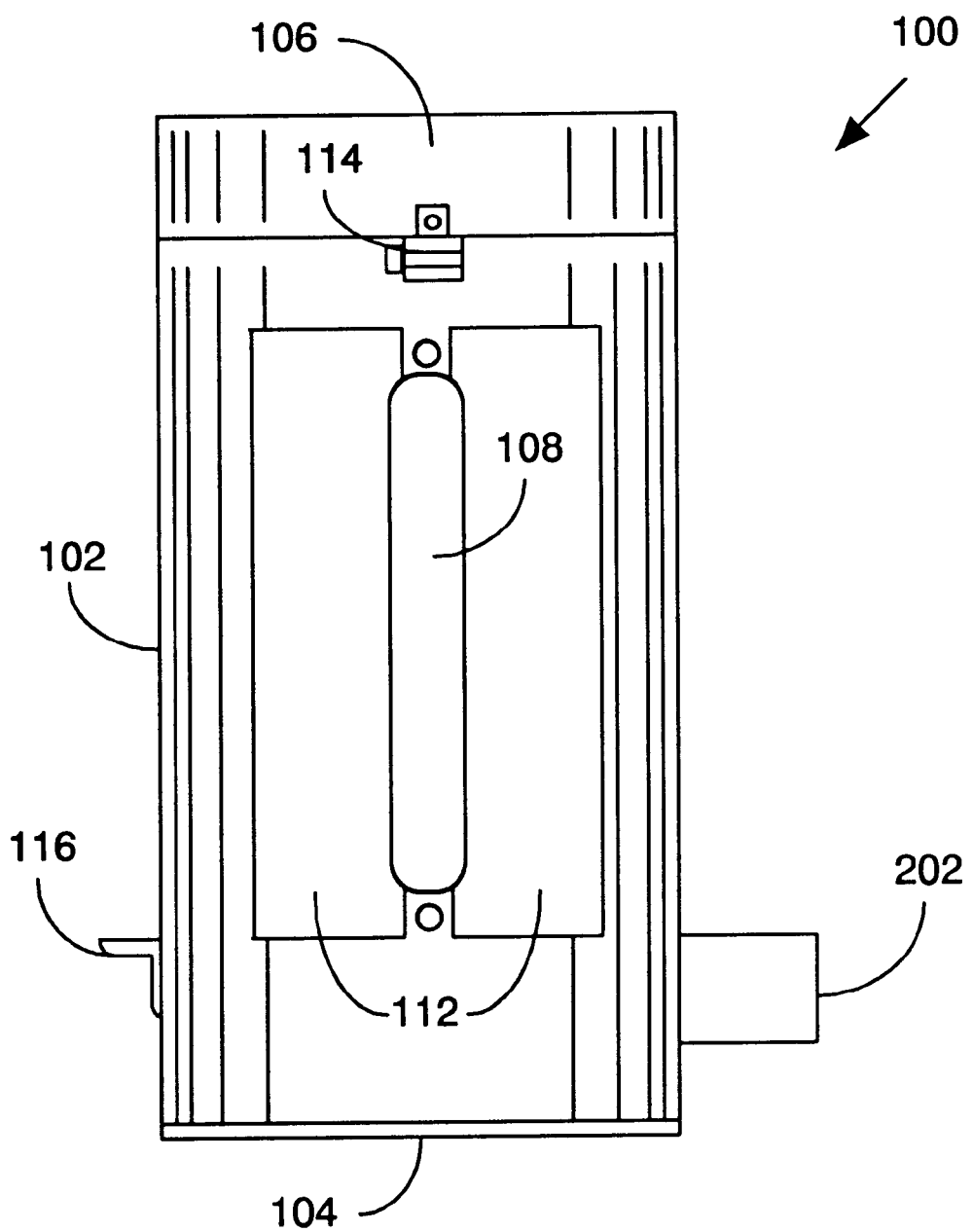
FIG. 3 is a handle side view of the embodiment of FIG. 1.

FIG. 3 shows a handle side view of the embodiment of FIG. 1. This figure also better illustrates the heat shield 112 which is designed to protect the users hands. During operation of the charcoal igniter 100, temperatures on the outer cylindrical wall 102 can reach high levels. The heat shield 112 helps prevent injury due to these high temperature levels.

Those skilled in the art will recognize that cylindrical outer wall 102 can be fabricated with multiple layers which are separated and/or insulated such that heat on the outer surface is reduced and internal temperatures are raised even further. By so doing, the cost of the charcoal igniter 100 is increased but the device is safer to use and will ignite the charcoal 704 even faster since more heat will be concentrated inside the charcoal chamber 708. However, for ease of illustration, the cylindrical outer wall 102 will be discussed as a single layer of material even though it may in practice be several separate or insulated layers fabricated from any suitable materials.

Figure 4:
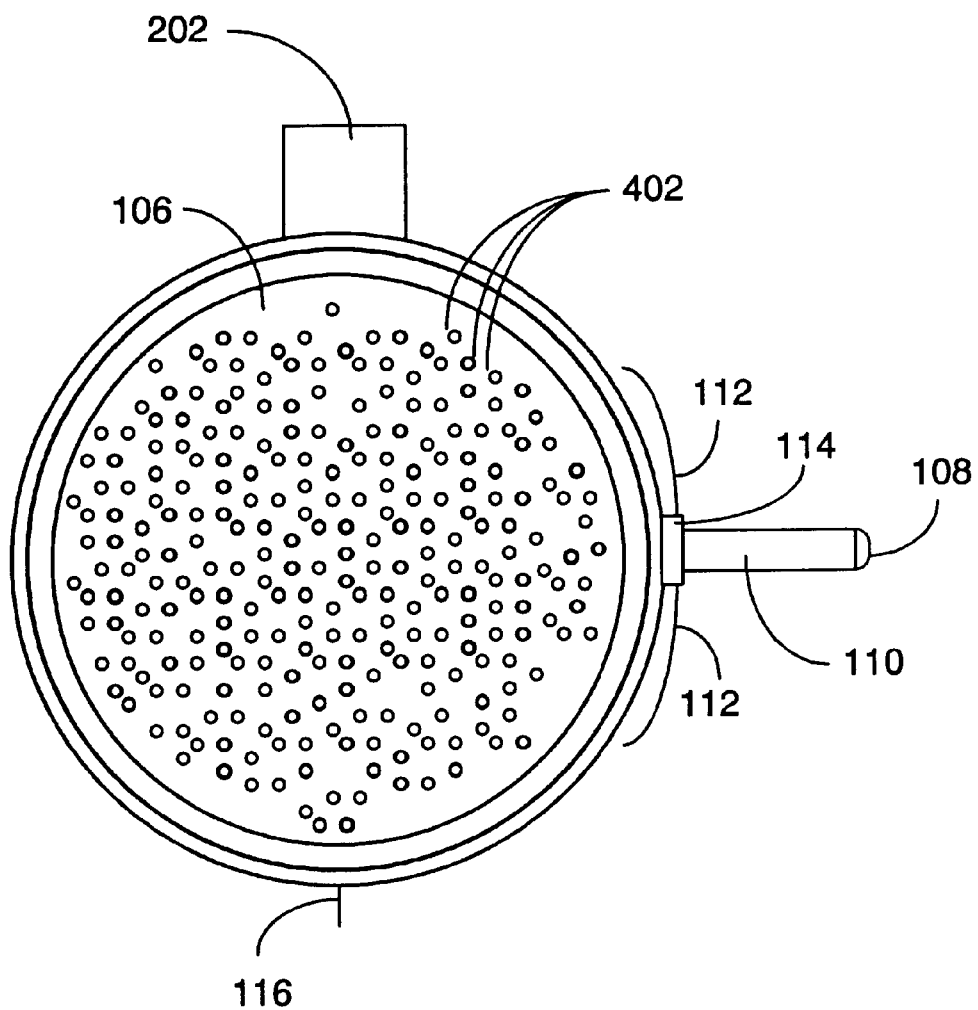
FIG. 4 is a top view of the embodiment of FIG. 1 in the ignition position. This view illustrates the apertures in the upper surface of the thermal barrier which produce a restricted airflow.

FIG. 4 shows a top view of the embodiment of FIG. 1 in the ignition position. This view illustrates the apertures 402 (perforations) in the upper surface 118 of the thermal barrier 106 which allow a restricted airflow. When properly attached to cylindrical outer wall 102, thermal barrier 106 will direct substantially all of the airflow through charcoal igniter 100 through apertures 402.

Figure 5:
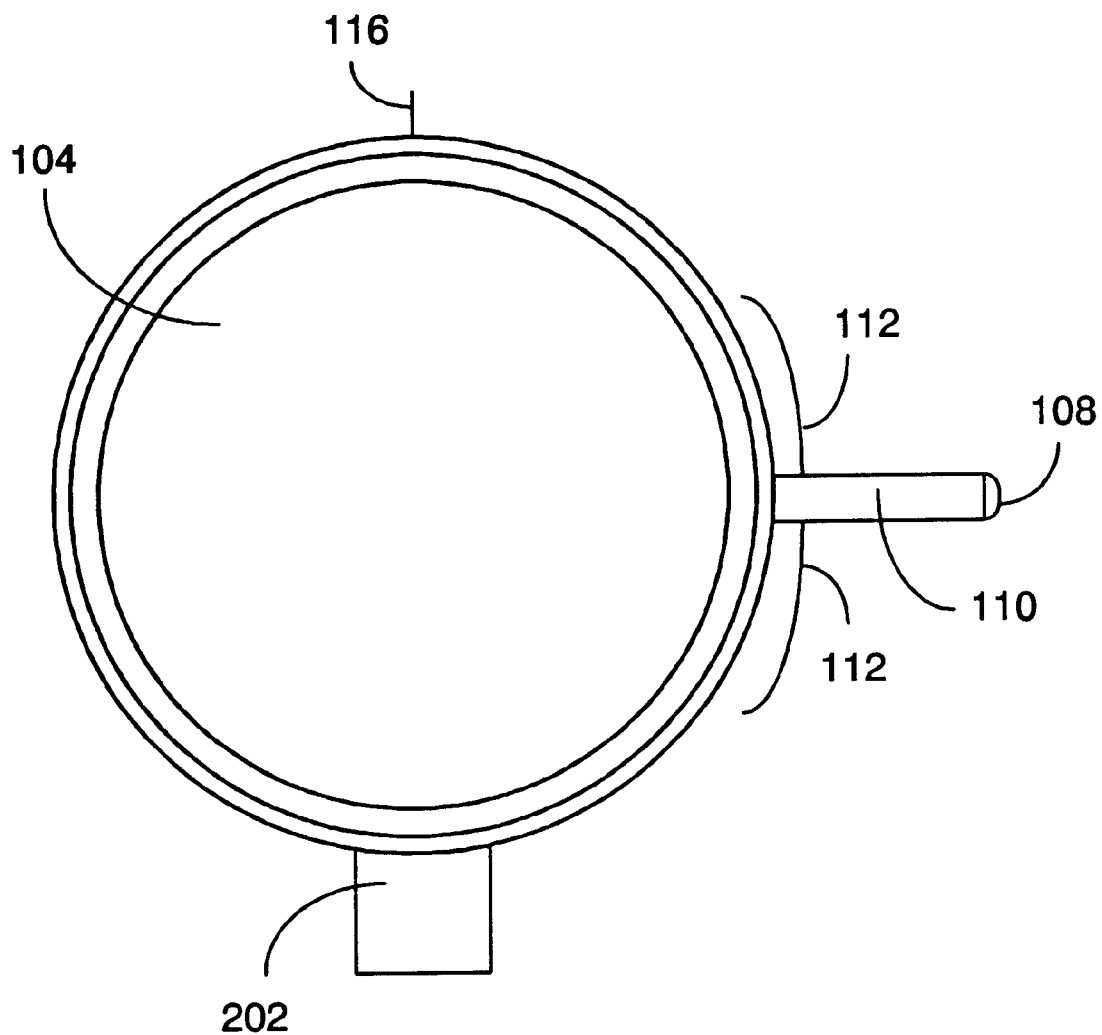
FIG. 5 is a bottom view of the embodiment of FIG. 1. This view illustrates the optional lower lid.

FIG. 5 shows a bottom view of the embodiment of FIG. 1. This view illustrates the lower lid 104. In the preferred embodiment, lower lid 104 is removably attached to cylindrical outer wall 102 by pressure fit. However, any suitable method of attachment can be used. The advantage of lower lid 104 is that it prevents ashes and residue from kindling 706 or charcoal 704 from falling out of the charcoal igniter 100 when it is lifted. Lower lid 104 can also be eliminated entirely from charcoal igniter 100. However, its elimination would result in the residue from the kindling 706 and/or charcoal 704 falling out of the bottom of the charcoal igniter 100, thus requiring extra work to clean up.

Figure 6:
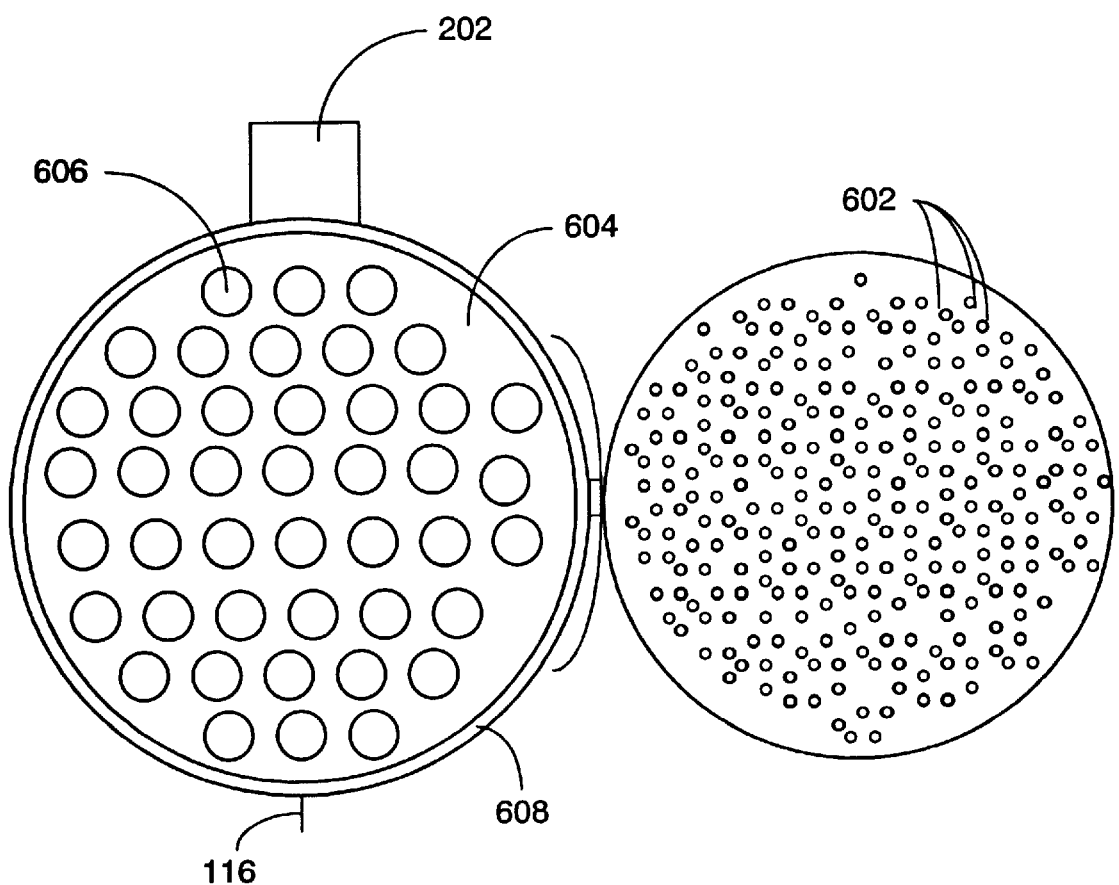
FIG. 6 is a top view of the embodiment of FIG. 1 in the pouring position. This view illustrates the apertures in the lower surface of the thermal barrier which allow a restricted airflow into the thermal barrier from the charcoal chamber. Also shown is a grate in the bottom of the charcoal chamber with apertures for input airflow.

FIG. 6 is a top view of the embodiment of FIG. 1 in the pouring position. This view illustrates the apertures 602 in the lower surface of the thermal barrier 106 which allow a restricted airflow into the thermal barrier 106 from the charcoal chamber 708 when the thermal barrier 106 is in the ignition position. Also shown is a grate 604 in the bottom of the charcoal chamber 708 with apertures 606 to permit input airflow.

Figure 7:
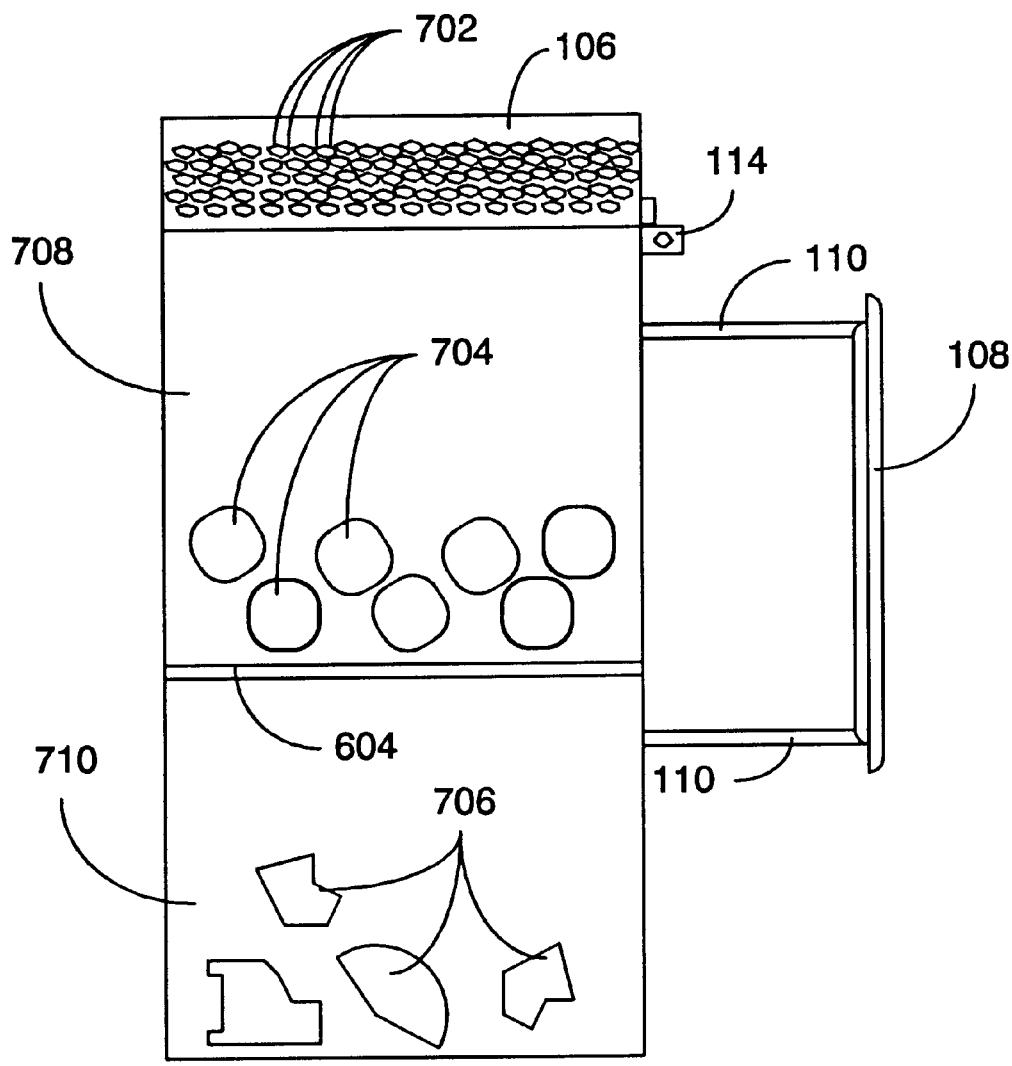
FIG. 7 is a cutaway view of the embodiment of FIG. 1. This view illustrates the charcoal chamber with charcoal briquettes inside, the thermal barrier with crushed lava rock inside the barrier chamber, and kindling inside the kindling chamber.

FIG. 7 is a cutaway side view illustrating a preferred embodiment of the charcoal igniter 100 that uses a lower kindling chamber 710. Kindling 706 is placed in kindling chamber 710. Charcoal 704 is inserted into charcoal chamber 708 and rests on grate 604. The thermal barrier 106 is hingedly moved to the pouring position to allow charcoal 704 to be inserted through the exhaust port. The thermal barrier 106 is then moved back to the ignition position.

Also shown in this figure is thermally resistive material 702 which is used to absorb heat from exhaust fumes leaving charcoal igniter 100 through the apertures 402, 602. Thermally resistive material 702 is granulated in the preferred embodiment and is sized to be as small as possible without risking pieces of thermally resistive material 702 falling through apertures 402 or 602. While size is not critical, the preferred embodiment uses crushed lava rock having a diameter of approximately 0.25 inches. This allows the inner barrier chamber of thermal barrier 106 to be substantially filled with thermally resistive material 702 such as crushed lava rock. The thermally resistive material 702 provides several advantages. It prevents ash and sparks from escaping through the apertures 402, 602. In addition, it absorbs heat from exhaust fumes which would otherwise be wasted and re-radiates it into the charcoal chamber 708. This recycled heat accelerates the ignition process to bring the charcoal 704 to cooking temperature faster.

While those skilled in the arts will recognize that any number of materials may be suitable as thermally resistive material 702, the preferred embodiment uses commonly available lava rock which is suitable for high temperature uses and is economical and easy to handle.

Figure 8:
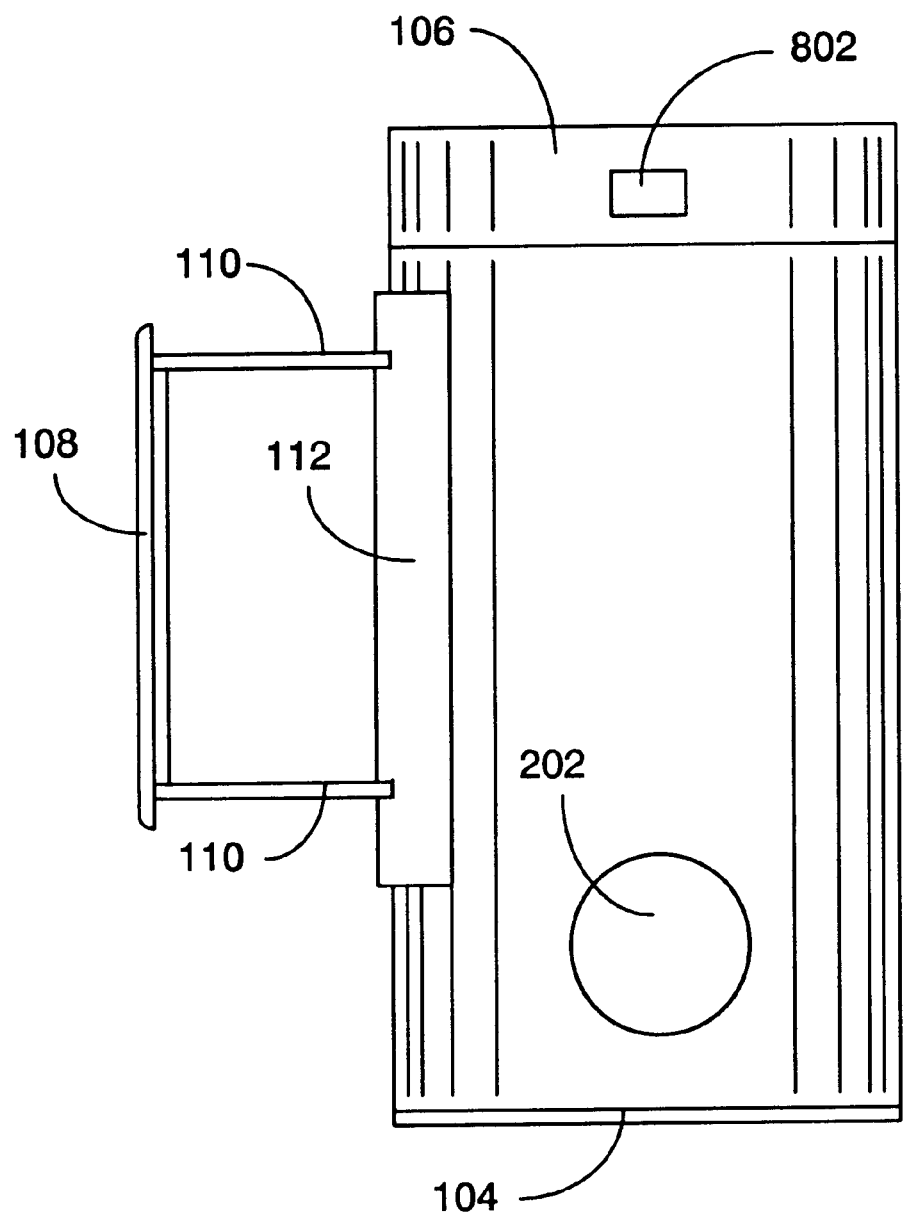
FIG. 8 is a right side view of an alternative hingeless embodiment which has a handle attached to the thermal barrier to assist in removal of the thermal barrier.

FIG. 8 shows an alternative embodiment which uses a thermal barrier handle 802 that is attached to thermal barrier 106. The hinge 114 shown in other embodiments is eliminated.

Figure 9:
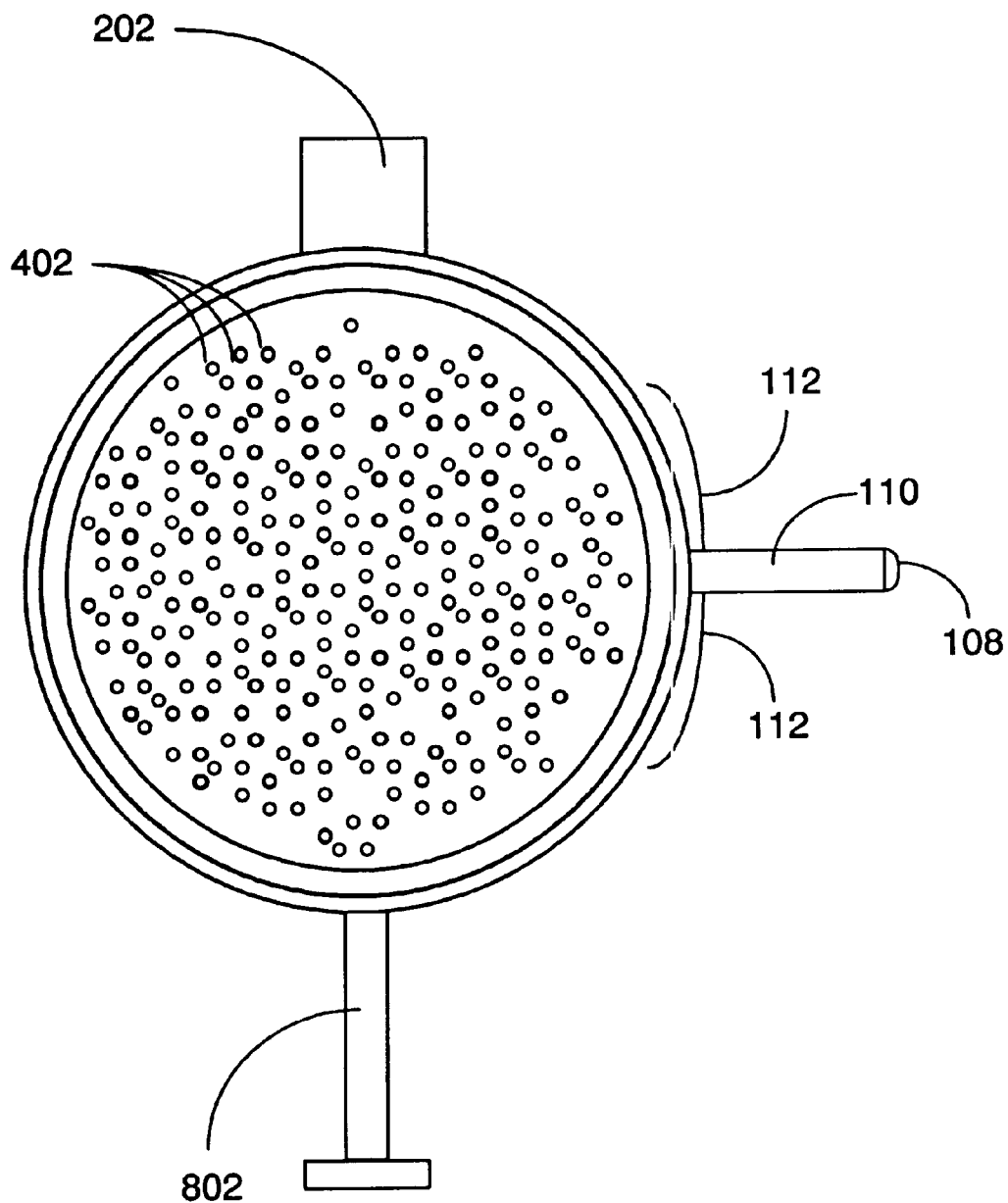
FIG. 9 is a top view of the embodiment of FIG. 8.

FIG. 9 illustrates a top view of the embodiment of FIG. 8. The thermal barrier handle 802 shown here is preferably made from an insulated material to protect the user's hand.

Figure 10:
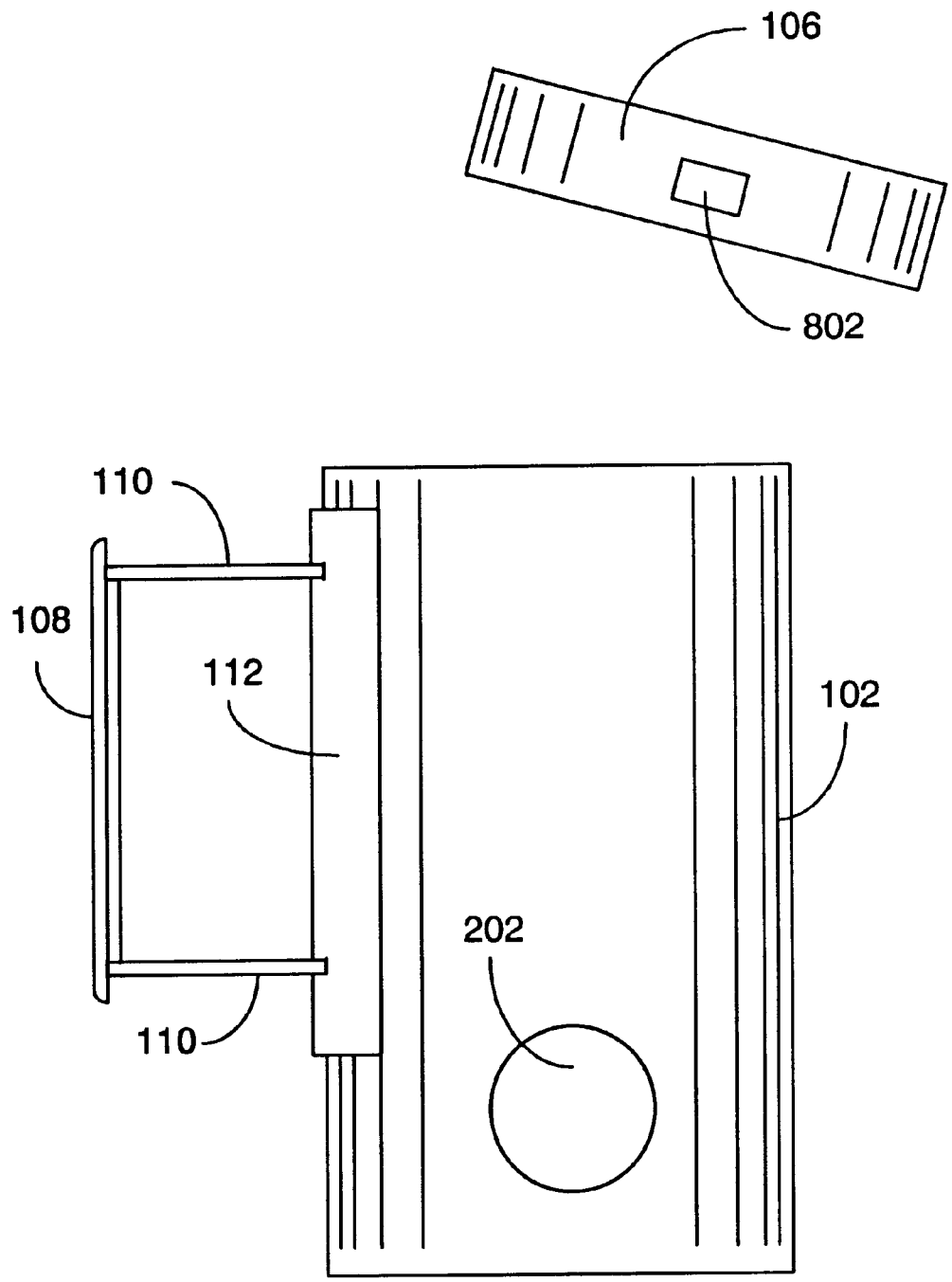
FIG. 10 is a right side view of the embodiment of FIG. 8 with the thermal barrier lifted up and away from the charcoal chamber prior to pouring.

As shown in FIG. 10, the thermal barrier of the embodiment of FIGS. 8–9 can be lifted away from the cylindrical outer wall 102 to facilitate discharge of the charcoal 704 once the charcoal 704 is ignited.

Figure 11:
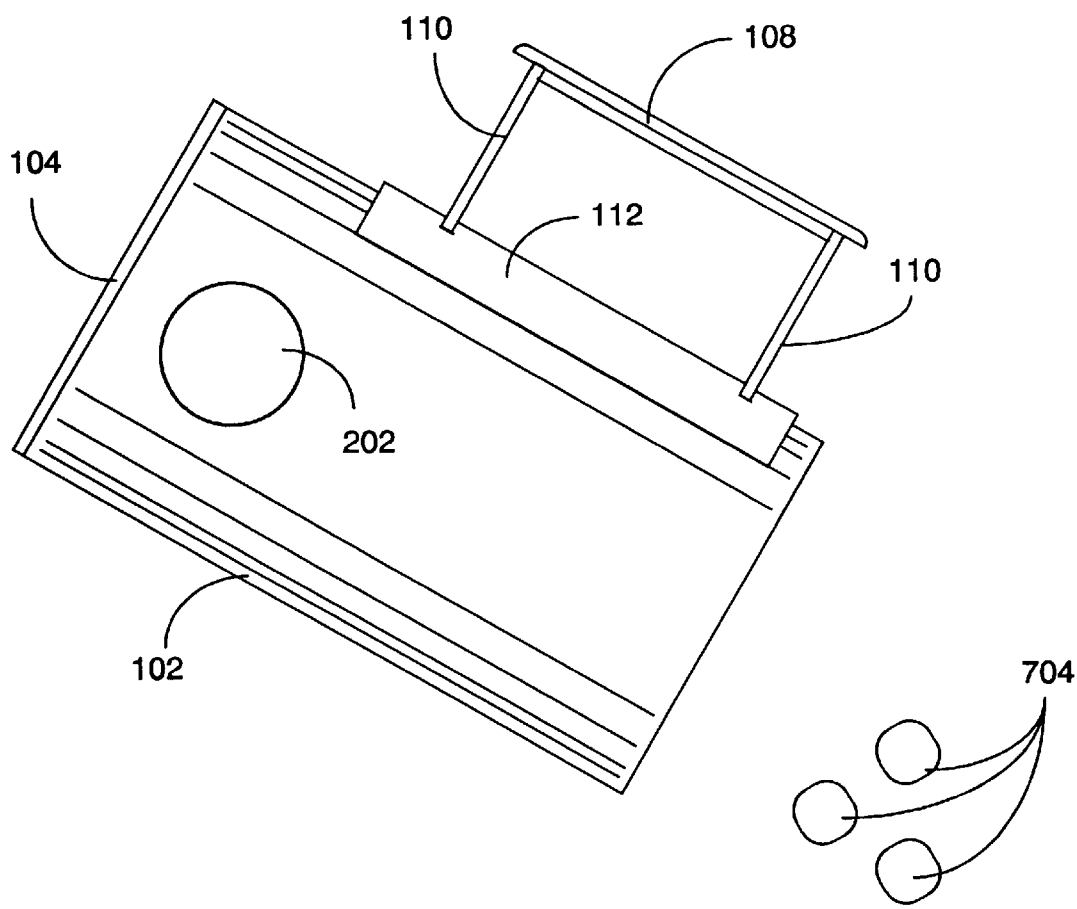
FIG. 11 illustrates the charcoal being poured out of the charcoal chamber after ignition.

FIG. 11 illustrates the charcoal 704 being discharged from the charcoal igniter 100 after the charcoal 704 has been ignited. If thermal barrier 106 was attached to cylindrical outer wall 102 via hinge 114, then the thermal barrier 106 would swing open under the force of gravity and the weight of the charcoal 704 to release the charcoal 704.

Figure 12:
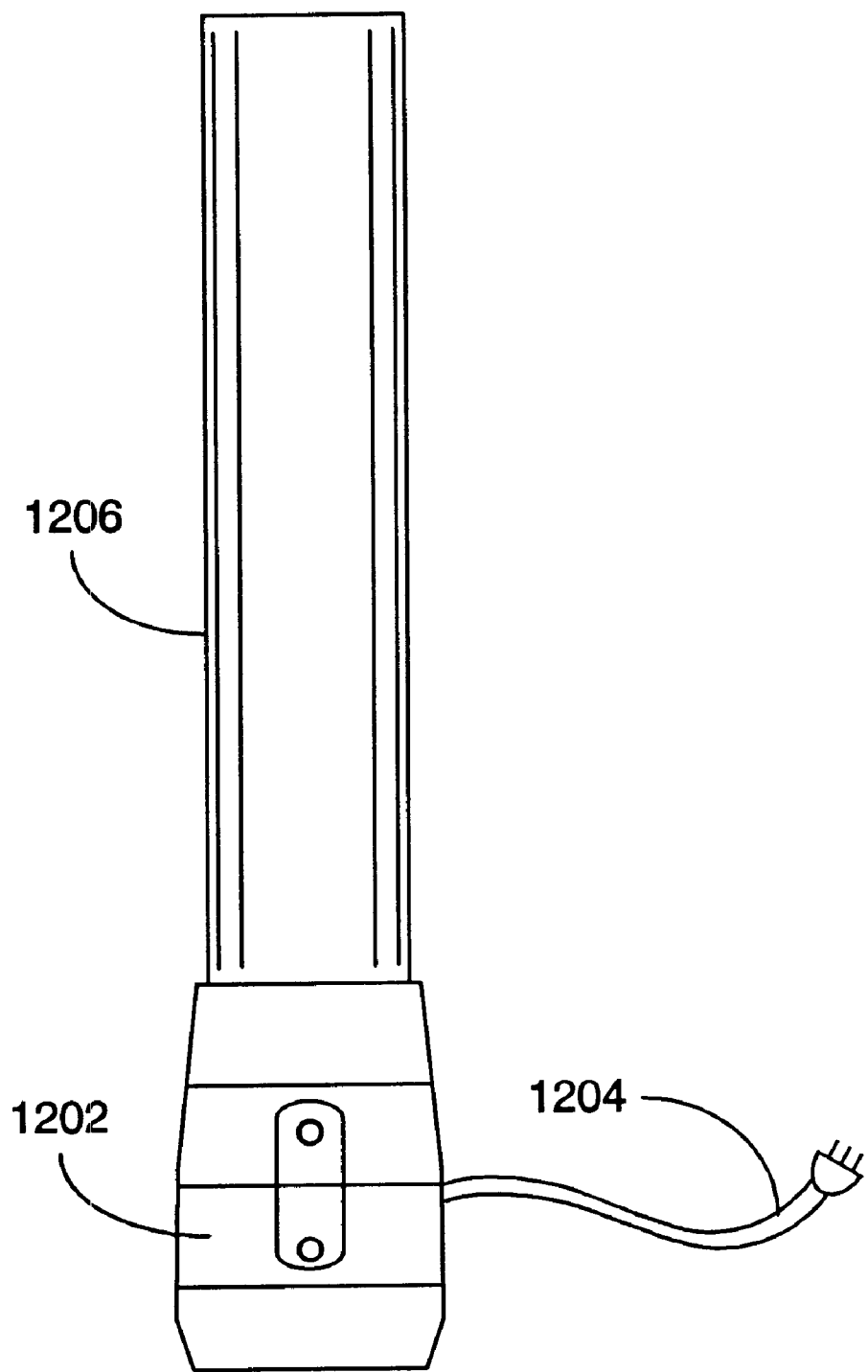
FIG. 12 shows an air blower with an integral air conduit.

FIG. 12 is an illustration of an optional air blower 1202 which power cord 1204 and air conduit 1206. For ease of illustration, the air blower 1202 is shown as a device which is specifically designed for use with charcoal igniter 100. However, it can be any available air blowing device such as a hair dryer. Likewise, the air conduit 1206 is shown as a rigid and fixedly attached pipe, but it can also be fabricated from any suitable material such as flexible hosing. The figure illustrates air blower 1202 having a conventional three prong electrical outlet plug 1204 for supplying power. However, those skilled in the art will recognize that a variety of alternative power sources can be used. For example, an adapter for use with an automobile cigarette plug may be used, as well as portable power supplies such as batteries or hand operated electric generators.

By careful design, the airflow through the thermal barrier 106 may be sufficient to ignite the charcoal 704. However, air blower 1202 ensures that sufficient oxygen is available to ignite charcoal 704. Further, by increasing the airflow with air blower 1202, the charcoal 704 will ignite more rapidly and result in improved performance of charcoal igniter 100.

Figure 13:
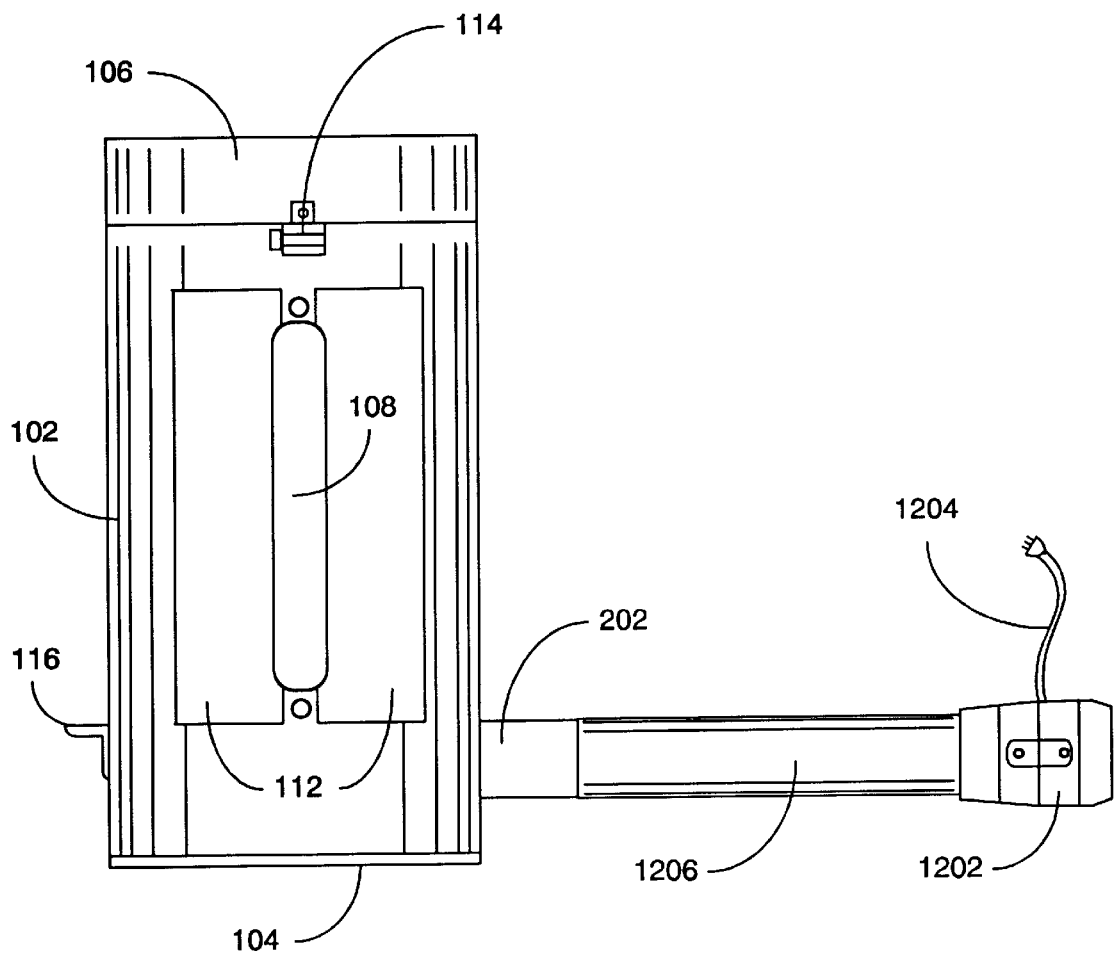
FIG. 13 illustrates the air blower and conduit of FIG. 12 attached to the air intake port.

FIG. 13 shows air blower 1202 attached to charcoal air intake port 202 via air conduit 1206. The advantage of using a conduit such as air conduit 1206 is that it distances air blower 1202 from charcoal igniter 100. By separating air blower 1202 from charcoal igniter 100, the chance of thermal damage to air blower 1202 from heat generated by charcoal igniter 100 is reduced. In particular, backdraft into the air blower 1202 when it is turned off may expose the air blower 1202 components to immediate damage or weaken them such that the air blower 1202 fails earlier in its useful life than it should. In addition, the increased airflow generated by air blower 1202 accelerates the combustion of charcoal 704 in charcoal chamber 708, thereby further reducing charcoal 704 ignition time.

Figure 14:
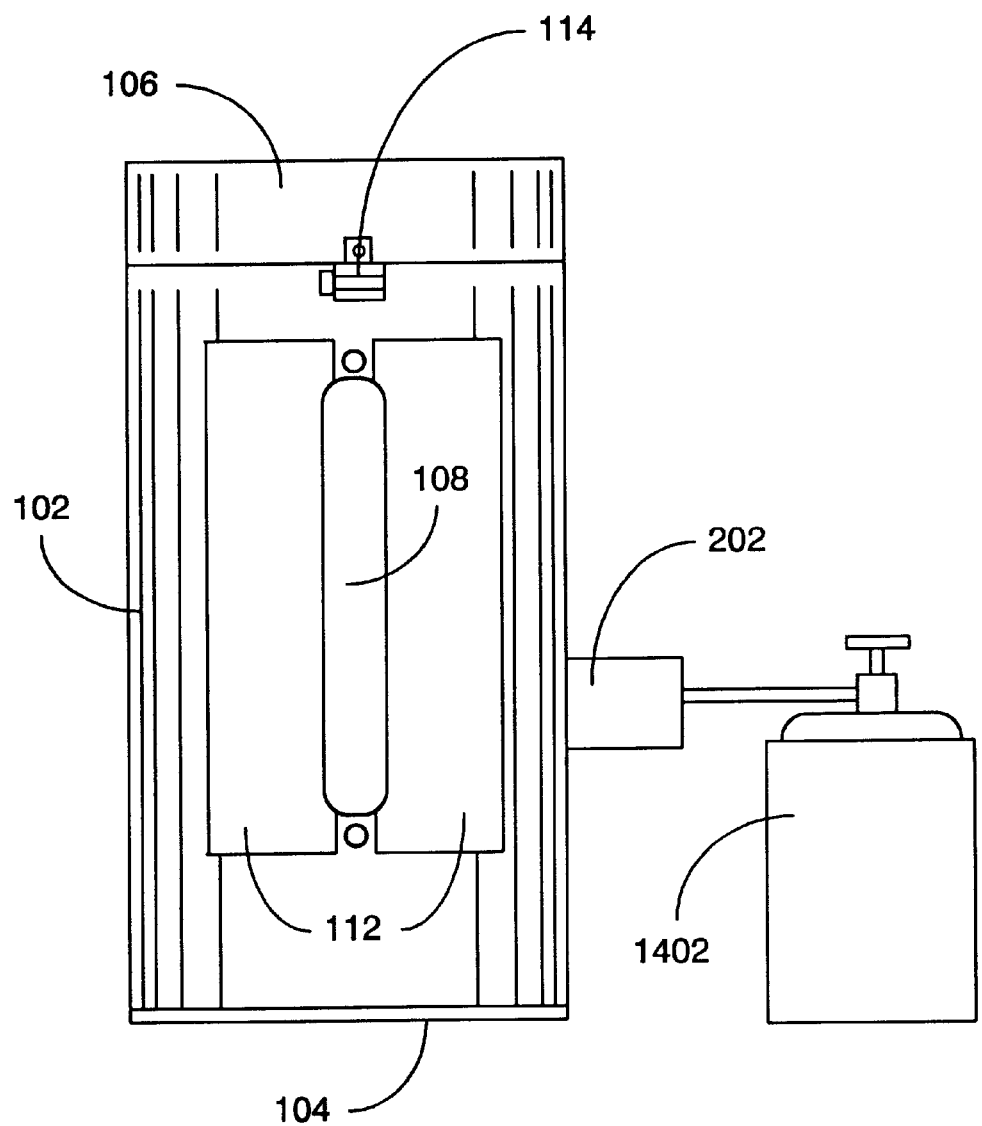
FIG. 14 shows a preferred embodiment of the charcoal igniter with a propane gas burner inserted into the air intake port.

FIG. 14 is another alternative embodiment which uses a gas or propane torch 1402 to directly ignite charcoal 704.

This eliminates the need for a lower kindling chamber 710 and eliminates residue from kindling 706. In this embodiment, the nozzle of torch 1402 is inserted into air intake port 202 and the flame from the torch nozzle is directly applied to the charcoal 404. This embodiment does not show access port 116 which is an optional feature that appears in the other embodiments as a convenience for the user.

While the invention has been described with respect to a preferred embodiment thereof, it will be understood by those skilled in the art that various changes in detail may be made therein without departing from the spirit, scope, and teaching of the invention. For example, the material used to construct the cylindrical outer wall 102 or other components may be anything suitable for the temperatures used. The size and shape of the charcoal igniter 100 may vary. The type of thermally resistive material may vary, etc. Accordingly, the invention herein disclosed is to be limited only as specified in the following claims.

I claim:

1. An apparatus for accelerating the ignition of charcoal briquettes, comprising:
   a charcoal chamber having a size suitable for heating charcoal briquettes, the charcoal chamber having at least one air path to allow air to enter the charcoal chamber, the charcoal chamber further having an exhaust port; and
   a thermal barrier movably attached to the exhaust port, the thermal barrier restricting airflow from exiting the charcoal chamber through the exhaust port such that when the charcoal chamber is heated, the thermal barrier includes means to restrict heat from escaping through the exhaust port, the thermal barrier further being movably attached to the exhaust port such that it can be separated from the exhaust port to permit discharge of the charcoal briquettes once they are ignited;
   whereby the thermal barrier retains heat within the charcoal chamber to accelerate the ignition of charcoal briquettes.

2. An apparatus, as in claim 1, further comprising:
   an air intake port in the charcoal chamber;
   an air blower having a blower output; and
   conduit means attached to the blower output and the air intake port such that air from the air blower is channeled from the air blower to the air intake port in the charcoal chamber;
   whereby the air blower accelerates charcoal ignition by increasing airflow through the charcoal chamber.

3. An apparatus, as in claim 1, further comprising:
   an air intake port in the charcoal chamber; and
   a combustible gas supply, the combustible gas supply having an output nozzle which is sized such that it can be inserted into the air intake port, and such that ignited gas output from the output nozzle can be directed into the charcoal chamber;
   whereby the charcoal is ignited by a combustible gas supply.

4. An apparatus, as in claim 1, further comprising a kindling chamber located below the charcoal chamber and having sufficient space to hold kindling material;
   whereby kindling material can be ignited in the kindling chamber to heat the charcoal chamber to charcoal ignition temperature.

5. An apparatus, as in claim 4, further comprising a lower lid, detachably attached to the kindling chamber such that kindling material in the kindling chamber will be held in the kindling chamber if the apparatus is lifted.

6. An apparatus, as in claim 5, further comprising:
   an outer perimeter secured to the output exhaust port such that the air path through the output exhaust port is substantially sealed;
   a lower surface having at least one aperture for airflow;
   an upper surface having at least one aperture for airflow;
   an inner barrier chamber formed by the lower surface, the upper surface and the outer perimeter;
   a plurality of granulated thermally resistive material, the thermally resistive material sized such that it would not pass through the apertures in the upper or lower surfaces, the thermally resistive material further capable of absorbing heat from airflow passing through the inner barrier chamber and re-radiating absorbed heat into the charcoal chamber; and
   a handle attached to the thermal barrier such that the thermal barrier can be removed from the charcoal chamber with the handle.

7. An apparatus, as in claim 6, wherein the thermally resistive material is fabricated from lava rock.

8. An apparatus, as in claim 7, further comprising:
   an air intake port in the charcoal chamber;
   an air blower having a blower output; and
   conduit means attached to the air blower output and the air intake port such that air from the air blower is channeled from the air blower to the air intake port in the charcoal chamber.

9. An apparatus for accelerating the ignition of charcoal briquettes, comprising:
   a charcoal chamber having a size suitable for heating charcoal briquettes, the charcoal chamber having at least one air path to allow air to enter the charcoal chamber, the charcoal chamber further having an exhaust port; and
   a thermal barrier attached to the exhaust port, the thermal barrier restricting airflow from exiting the charcoal chamber through the exhaust port such that when the charcoal chamber is heated, the thermal barrier includes means to restrict heat from escaping through the exhaust port, the thermal barrier further comprising:
      an outer perimeter secured to the output exhaust port such that the air path through the output exhaust port is substantially sealed;
      a lower surface having at least one aperture for airflow;
      an upper surface having at least one aperture for airflow;
      an inner barrier chamber formed by the lower surface, the upper surface and the outer perimeter; and
      a plurality of granulated thermally resistive material, the thermally resistive material sized such that it would not pass through the apertures in the upper or lower surfaces, the thermally resistive material further capable of absorbing heat from airflow passing through the inner barrier chamber and re-radiating absorbed heat into the charcoal chamber;
   whereby the thermal barrier retains heat within the charcoal chamber to accelerate the ignition of charcoal briquettes.

10. An apparatus, as in claim 9, wherein the thermally resistive material is fabricated from lava rock.

11. An apparatus, as in claim 9, further comprising a hinge, the hinge attaching the thermal barrier to the charcoal chamber such that the thermal barrier can be hingedly moved from an ignition position to a pouring position, when in the ignition position the exhaust port is substantially sealed by the outer perimeter and when in the pouring position the thermal barrier is hingedly moved away from the exhaust port to allow the charcoal chamber to be emptied.

12. An apparatus, as in claim 9, wherein the thermal barrier further comprises a handle attached to the thermal barrier;

whereby the thermal barrier can removed from the charcoal chamber with the handle.

13. An apparatus for accelerating the ignition of charcoal briquettes, comprising:

a charcoal chamber having a size suitable for heating charcoal briquettes, the charcoal chamber having at least one air path to allow air to enter the charcoal chamber, the charcoal chamber further having an exhaust port; and a thermal barrier attached to the exhaust port, the thermal barrier restricting airflow from exiting the charcoal chamber through the exhaust port such that when the charcoal chamber is heated, the thermal barrier includes means to restrict heat from escaping through the exhaust port;

an outer perimeter secured to the output exhaust port such that the air path through the output exhaust port is substantially sealed;

a lower surface having at least one aperture for airflow;

an upper surface having at least one aperture for airflow;

an inner barrier chamber formed by the lower surface, the upper surface and the outer perimeter;

thermally resistive material, the thermally resistive material sized such that it would not pass through the apertures in the upper or lower surfaces, the thermally resistive material further capable of absorbing heat from airflow passing through the inner barrier chamber and re-radiating absorbed heat into the charcoal chamber;

a hinge, the hinge attaching the thermal barrier to the charcoal chamber such that the thermal barrier can be hingedly moved from a ignition position to an pouring position, when in the ignition position the exhaust port is substantially sealed by the outer perimeter and when in the pouring position the thermal barrier is hingedly moved away from the exhaust port to allow the charcoal chamber to be emptied;

a kindling chamber located below the charcoal chamber and having sufficient space to hold kindling material; and a lower lid, detachably attached to the kindling chamber such that kindling material in the kindling chamber will be held in the kindling chamber if the apparatus is lifted;

whereby the thermal barrier retains heat within the charcoal chamber to accelerate the ignition of charcoal briquettes; and the kindling material can be ignited in the kindling chamber to heat the charcoal chamber to charcoal ignition temperature.

14. An apparatus, as in claim 13, wherein the thermally resistive material is fabricated from lava rock.

15. An apparatus, as in claim 14, further comprising:

an air intake port in the charcoal chamber;

an air blower having a blower output; and conduit means attached to the air blower output and the air intake port such that air from the air blower is channeled from the air blower to the air intake port in the charcoal chamber;

whereby the air blower accelerates charcoal ignition by increasing airflow through the charcoal chamber.

16. A method of accelerating the ignition of charcoal, including the steps of:

igniting charcoal in a charcoal chamber, the charcoal chamber having at least one air path to allow air to enter the charcoal chamber, the charcoal chamber further having an exhaust port; and restricting airflow from exiting the charcoal chamber with a thermal barrier attached to the exhaust port, the thermal barrier having an outer perimeter, an upper surface, and a lower surface, the outer perimeter is attached to the exhaust port such that when the charcoal in the charcoal chamber is ignited, the thermal barrier includes means to restrict heat from escaping through the exhaust port;

locating at least one aperture for airflow in the lower surface;

locating at least one aperture for airflow in the upper surface;

forming an inner barrier chamber with the lower surface, the upper surface and the outer perimeter; and retaining heat within the charcoal chamber with thermally resistive material, the thermally resistive material sized such that it would not pass through the apertures in the upper or lower surfaces, the thermally resistive material further capable of absorbing heat from airflow passing through the inner barrier chamber and re-radiating absorbed heat into the charcoal chamber, whereby the thermal barrier retains heat within the charcoal chamber to accelerate the ignition of charcoal.

17. A method, as in claim 16, including the additional steps of:

forming a kindling chamber below the charcoal chamber to hold kindling material; and attaching a lower lid to the kindling chamber such that kindling material in the kindling chamber will be held in the kindling chamber when the apparatus is lifted;

whereby kindling material can be ignited in the kindling chamber to heat the charcoal chamber to charcoal ignition temperature.

18. A method, as in claim 17, including the additional steps of:

using an air intake port in the charcoal chamber to input air;

blowing air from an air blower with a blower output into the air intake port; and using conduit means to channel air from the blower output to the air intake port;

whereby the air blower accelerates charcoal ignition by increasing airflow through the charcoal chamber.

19. A method, as in claim 17, including the additional step of using lava rock as the thermally resistive material.

20. A method, as in claim 19, including the additional steps of:

using an air intake port in the charcoal chamber to input air;

blowing air from an air blower having a blower output into the air intake port; and using conduit means to channel air from the blower output to the air intake port;

whereby the air blower accelerates charcoal ignition by increasing airflow through the charcoal chamber.

* * * * *